L. VAN GILDER.
WATER METER.
APPLICATION FILED JULY 10, 1915.

1,189,020.

Patented June 27, 1916.

Inventor.
Lincoln Van Gilder
by his Attorneys
Howson & Howson

UNITED STATES PATENT OFFICE.

LINCOLN VAN GILDER, OF VENTNOR, NEW JERSEY.

WATER-METER.

1,189,020.  Specification of Letters Patent.  Patented June 27, 1916.

Application filed July 10, 1915. Serial No. 39,073.

*To all whom it may concern:*

Be it known that I, LINCOLN VAN GILDER, a citizen of the United States, residing in Ventnor, Atlantic county, State of New Jersey, have invented certain Improvements in Water-Meters, of which the following is a specification.

One object of this invention is to provide a form of water meter in which the various parts shall be so arranged as to avoid the necessity of a stuffing box between the measuring and registering chambers of said meter, with a view to making it possible to operate all of the mechanism above or in addition to the measuring apparatus within a body of oil and yet effectually prevent leakage or loss of said oil.

Another object of the invention is to so arrange the parts of a water meter embodying the above features, that the portion of the oil which might, after a considerable time, become discolored, is kept from the registering chamber where it might interfere with the visibility of the dials or registering numbers of said mechanism.

I also desire to arrange the inlet and outlet openings of a meter in such manner as to permit of its being easily put in place and connected to or removed from a system of piping; the arrangement of parts being such as to tend to prevent or render difficult the malicious reversal of the meter without detection, as well as to likewise prevent the trapping of air in the meter.

Figure 1:
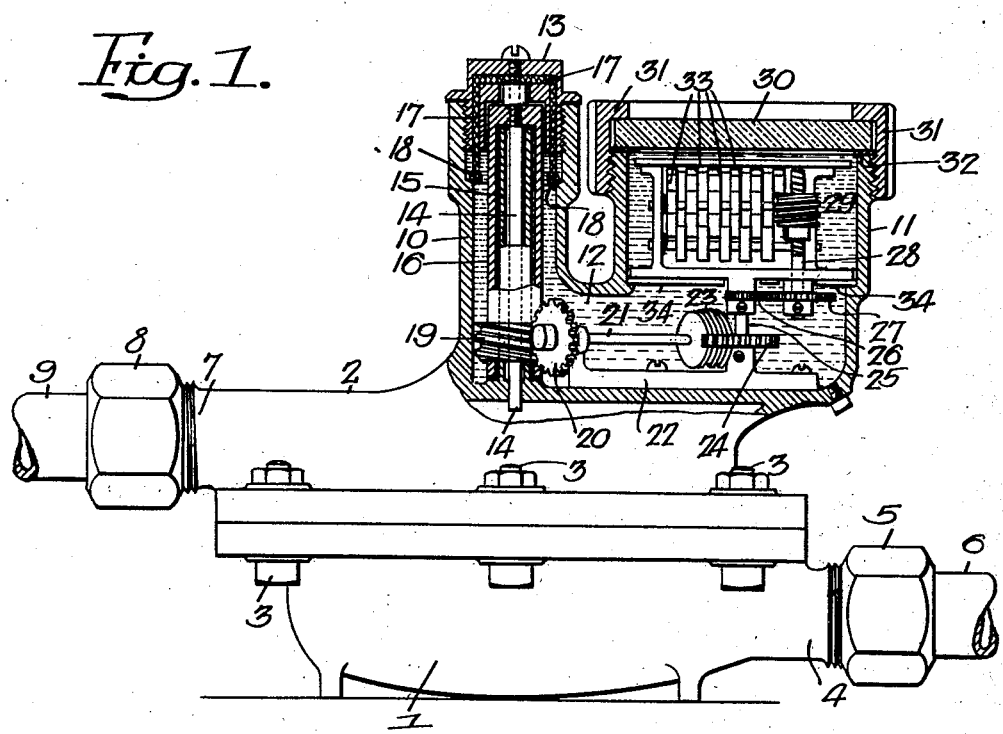
Figure 2:
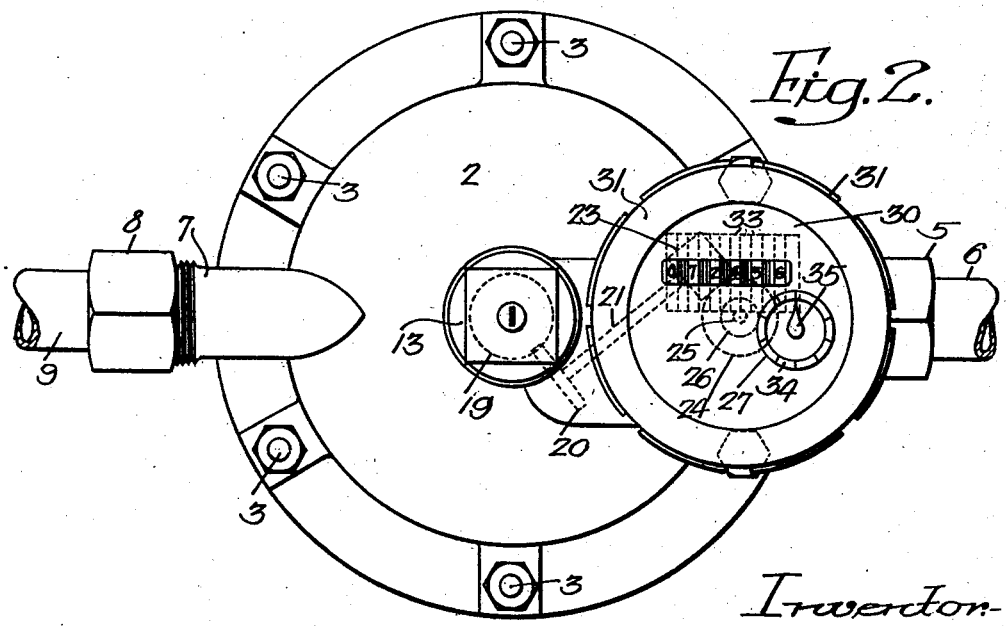

These objects and other advantageous ends I secure as hereinafter set forth, reference being had to the accompanying drawings, in which, Figure 1 is a side elevation, partly in section illustrating a water meter equipped with my invention; and Fig. 2 is a plan of the apparatus shown in Fig. 1.

In the above drawings, 1 and 2 represent two flanged castings together constituting the measuring chamber or main casing of a water meter, the flanges of these members being connected by bolts 3. The lower casing section 1 is provided at one side with a tubular threaded extension 4 constituting the inlet of the meter, which, by means of a nut 5, may be coupled to a water supply pipe 6. Similarly the second section 2 has a tubular extension 7 constituting the outlet of the meter which is threaded for the section of the coupling nut 8 whereby it is connected to the water delivery pipe 9.

It will be noted that the inlet and outlet 4 and 7 are preferably so arranged as to extend in lines 180 degrees apart and at different levels, the casing 2 being of such construction that air cannot be trapped in its top portion but will naturally pass out through the pipe 9, which is at the highest part of the section 2.

The upper part of the meter section 2 is provided with two upwardly projecting extensions 10 and 11 forming chambers connected at their lower parts by a passage 12 and both preferably of circular section. The first of these chambers 10 is of relatively small interior diameter compared to its height and is normally closed by a cap 13 providing a bearing for the upper end of a spindle 14 which extends from the measuring chamber concentrically within this chamber 10. Surrounding said spindle in the chamber 10 to within a short distance of its upper end is a tube or tubular partition 15 which may be integral with the body of the section 2 or may be attached thereto by threads, so that the liquid cannot pass into it from either the chambers 10 or 11 except by way of its top or upper end which is open.

Fixed to the upper end of the spindle 14, so as to be compelled to turn therewith, is a tubular spindle 16 which is closed at its upper end and fits down around the tubular partition 15 to within a short distance of the bottom of the chamber 10; it being noted that the U-shaped passage or conduit thus formed by the parts 15 and 16 constitutes a trap which effectually prevents fluid flow from the chamber 11 under conditions of use. In order to lubricate the bearing for the upper end of the spindle 14, I provide a passage through the cap 13 in which is mounted a wick 17 whose ends project into the hollow of the chamber 10 where they are held down by means of a ring 18 to which they are attached. This ring preferably lies in a portion of the interior of said chamber formed in the upper part thereof and of a greater diameter than of the remainder, so that there is no danger of said ring falling to the bottom of the chamber in case it should become detached from its wick.

Adjacent the lower end of the tubular spindle 15 is fixed a worm gear 19 meshing with a worm wheel 20, fixed to a spindle 21 supported in suitable bearings on a removable frame 22 within the bottom portion of the chambers 10 and 11. This spindle 21 likewise has fixed to it a worm 23 meshing with a worm wheel 24 which is fixed to a vertically extending spindle 25. Through gears 26 and 27 this spindle transmits power to the driving spindle 28 of the registering mechanism 29, mounted within the upper part of the chamber 11 and constructed in a well known manner. Said chamber in the present instance is of a large diameter relatively to its height and is provided with a covering consisting of a relatively thick plate of glass 30 held by a threaded ring 31 to the upper end of the chamber 11, there being a gasket 32 clamped between said glass and the upper edge of the chamber wall to prevent leakage of liquid.

The edges of the ring 31 are preferably notched for the reception of a wrench and the arrangement of parts is such that the number disks 33 of the registering mechanism as well as a dial 34 and its coöperating pointer 35 are clearly visible through said glass plate 30.

Under conditions of use the pipe 6 is connected to a source of water supply and pipe 9 to a piping system to which water is to be delivered, it being obvious that such connection is greatly facilitated by reason of the fact that said pipes are of different levels since this arrangement is best adapted to the easy positioning of the meter relatively to the pipes. This arrangement is particularly advantageous when it is desired to remove or replace a meter in a pipe line previously installed.

The chamber formed by the two casing sections 1 and 2 contains any suitable form of measuring mechanism whereby the spindle 14 is caused to rotate a certain number of times for each gallon or other measured unit of water passing through the meter. The two chambers 10 and 11 are filled with a suitable grade of clear lubricating oil, the former of them to a height preferably slightly above the under surface of the cover glass 30, and obviously this oil cannot escape, since such level is below the upper end of the tubular partition 15.

Both the cover glass 30 and the cap 31 form air tight joints with their coöperating parts of the casing, so that regardless of the pressure in the meter no objectionable amount of water can by any possibility enter the chambers. As a consequence the tubular spindle 15, the worm wheel 20, spindle 21, worm 23, worm wheel 24, and all of the remainder of the registering mechanism will at all times operate in oil, and obviously, since this latter completely surrounds all parts of the mechanism 29, this latter as well is not only perfectly lubricated but the members on its wheels and dials are at all times clearly visible through the glass 30.

It is noted that the mechanism 29 is preferably carried on a partition 34 extending across the chamber 11 about midway up from the bottom, and while the hubs or bosses of the gears 26 and 27 pass loosely through this partition, the latter none the less effectually divides the oil into two bodies, of which that surrounding the mechanism 29 remains at all times clear and undisturbed, while that below said partition may possibly become slightly discolored owing to the more rapid operation of the mechanism which it surrounds or bathes.

The bearing for the upper end of the spindle 14 is effectually lubricated by oil drawn up through the wick 17 and obviously the apparatus may be depended on to continue in an operative condition for indefinitely prolonged periods of time, since it is always perfectly lubricated and none of its more delicate parts is exposed to the more or less corrosive action of the liquid measured, or to the clogging action which might result from the deposit of foreign material carried thereby.

I claim:—

1. The combination of two liquid containing chambers; driving mechanism in one chamber; driven mechanism in the other chamber; a trap connecting said chambers; a body of lubricant in the latter chamber immersing said driven mechanism; and power transmission means extending through said trap for connecting said two sets of mechanisms.

2. The combination of a casing containing liquid; registering mechanism operative in the liquid therein; a trap; and driving means connected to said registering mechanism through said trap.

3. The combination in a meter of a measuring chamber; a registering chamber; a body of liquid in said registering chamber; a trap connecting said chambers; mechanical devices of which one is immersed in the liquid in said chambers; and means extending through the trap for operatively connecting said devices.

4. The combination in a meter of a chamber of U-shaped section; registering mechanism in one branch of said chamber; a body of lubricating liquid divided into two parts by the chamber and submerging said registering mechanism; driving mechanism extending into the other branch of the chamber; and means for connecting said driving mechanism with the registering mechanism.

5. The combination in a meter of a hollow body; a chamber of U-shaped section connected thereto; registering mechanism in one branch of said chamber; driving mechanism extending from the body into the other branch; means for connecting said driving mechanism with the registering mechanism; a body of lubricating fluid trapped in said chamber and means for preventing escape of said fluid from the chamber into the body of the meter.

6. The combination in a meter of measuring and registering chambers; measuring and registering mechanisms in said chambers respectively; lubricating liquid in the registering chamber; and power transmission means connecting said two sets of mechanism, extending from the measuring mechanism first to the top and then to the lower portion of the registering chamber to normally prevent withdrawal of liquid from said latter chamber.

7. The combination in a meter of a casing; registering mechanism in said casing; a tube closed at its bottom and open adjacent the top of said casing; and driving means for the registering mechanism extending into said casing through said tube.

8. The combination in a meter of a casing; registering mechanism therein; an open top tube extending into said casing in position to prevent liquid from flowing out of the same; driving means connected to said mechanism and having a portion extending through said tube; and a body of liquid in the casing.

9. The combination of a casing; registering mechanism therein; a tube extending into the casing from the lower portion thereof and opening thereinto only at its upper portion; a second tube rotatably mounted on the first tube and connected to the registering mechanism; and a spindle extending through the first tube and operatively connected to the second tube.

10. The combination of a substantially U-shaped casing; driving mechanism mounted in one branch thereof; power transmission means connected to said mechanism, extending clear to the bottom of the casing and up into the second branch thereof; with means extending into said second branch of the casing for driving said mechanism.

11. The combination in a meter of a casing; registering mechanism in the upper part of said casing; driving means for said registering mechanism in the lower portion of the casing; a partition in the casing supporting said driving mechanism; and a measuring mechanism for actuating the driving mechanism.

12. The combination in a meter of a casing of substantially U-shaped section; registering mechanism mounted in the upper part of one branch of said casing; driving mechanism extending into the upper part of said second branch of said casing; means for connecting said driving mechanism with the registering mechanism; a body of lubricant in the casing surrounding said mechanism; and a partition in the casing separating the lubricant in the immediate vicinity of the registering mechanism from the remainder.

13. The combination in a meter of a casing of substantially U-shaped section; registering mechanism mounted in the upper part of one branch of said casing; driving mechanism extending into the upper part of the second branch of the casing; means for connecting said driving mechanism with the registering mechanism; a body of liquid in the casing surrounding said mechanism; and a partition in the first branch of the casing immediately below the registering mechanism.

14. The combination in a meter of a casing made in two sections, one of said sections including a substantially U-shaped chamber opening into the remainder of the casing only from its upper part; registering mechanism in said chamber; and measuring mechanism in the casing connected to said registering mechanism through the opening in the upper part of said U-shaped chamber.

15. The combination in a meter of a substantially U-shaped casing; a transparent cover for one branch of said casing; registering mechanism in said branch placed to be visible through said cover; with means extending into the casing through the upper part of the second branch thereof for actuating said mechanism.

16. The combination in a meter of a casing having two chambers; a tube closed at its bottom and opening into one of said chambers only at its upper end; a driving spindle extending through said tube and having a bearing adjacent the top of said tube; registering mechanism in the chamber; means operatively connecting said mechanism to said spindle; and a body of lubricant in the chamber.

17. The combination in a meter of a casing having two chambers; a tube closed at its bottom and opening into one of said chambers only at its upper end; a driving spindle extending through said tube and having a bearing adjacent the top thereof; registering mechanism in the chamber; means operatively connecting said mechanism to said spindle; a body of lubricant in the chamber; with means for supplying said lubricant to the bearing for said spindle.

18. The combination in a meter of a substantially U-shaped casing; a transparent cover for one branch of said casing; a removable cap for the other branch; registering mechanism placed in the first branch of the casing to be visible through said cover; actuating mechanism for the registering mechanism extending into the top of the second branch of the casing and thence downwardly; with the body of lubricant in the casing.

19. The combination in a meter of a casing having a tube opening thereinto only at its upper end; a driving spindle extending through said tube; a second tube connected to said spindle and extending down around the first tube; registering mechanism; and gearing connecting said mechanism with the second tube.

20. The combination in a meter of a registering chamber; a tube extending vertically in said chamber and opening thereinto only at its upper end; registering mechanism in the chamber; a body of lubricant in the chamber extending to a level sufficient to submerge the mechanism but below the top of the tube; and driving means, extending into the registering chamber through the tube, for actuating the mechanism therein.

21. The combination in a meter of a hollow body; a registering chamber closed to the atmosphere and connected to the body; registering mechanism in said chamber; a body of lubricant in the chamber; and a trap for preventing passage of said lubricant into the body of the meter.

22. The combination in a meter of a measuring chamber; driving mechanism therein; a registering chamber closed to the atmosphere and communicating with the measuring chamber; registering mechanism in the registering chamber actuated from the measuring mechanism; a body of lubricant in the registering chamber; and means for preventing passage of said lubricant from the registering chamber to the measuring chamber, including an element through which power is transmitted to the registering mechanism from the measuring mechanism.

23. The combination in a meter of registering mechanism; driving mechanism; a trap; and power transmission means passing through and including a portion of said trap for connecting the driving with the registering mechanism.

LINCOLN VAN GILDER.